Jan. 28, 1964 A. B. FOWLER 3,119,986
SUPERCONDUCTIVE STORAGE AND LOGIC DEVICES
WITH NUCLEATION PROPERTIES
Filed Dec. 31, 1959 3 Sheets-Sheet 1

INVENTOR
ALAN B. FOWLER

BY Thomas & Crickenberger
ATTORNEYS

Jan. 28, 1964 A. B. FOWLER 3,119,986

SUPERCONDUCTIVE STORAGE AND LOGIC DEVICES WITH NUCLEATION PROPERTIES

Filed Dec. 31, 1959 3 Sheets-Sheet 3

United States Patent Office 3,119,986
Patented Jan. 28, 1964

3,119,986

SUPERCONDUCTIVE STORAGE AND LOGIC DEVICES WITH NUCLEATION PROPERTIES

Alan B. Fowler, Wappingers Falls, N.Y., assignor to International Business Machines Corporation, New York, N.Y., a corporation of New York Filed Dec. 31, 1959, Ser. No. 863,202
15 Claims. (Cl. 340—173.1)

This disclosure relates to superconductive devices and more particularly to such devices employed as storage and logical devices.

A superconductive storage device may be defined generally as a device the condition or state of which is altered by the application of signals representative of information, and the condition or state remains so altered to indicate the presence of stored information. Many of the superconductive storage devices are binary type devices which employ a plurality of cryotrons and which may be generally classified as either persistent current storage devices or D.C. current diversion (flip-flop) type storage devices. A persistent current storage device usually consists of a closed loop of superconductive material in which binary information is stored in the form of a persistent current. In this case the two binary states may be represented either (1) by persistent current flowing in opposite directions or (2) by the presence or the absence of a persistent current. The flip-flop storage devices, somewhat analogous to vacuum tube flip-flop circuits, include two superconductive current paths connected in parallel with a D.C. current source. The two binary states of the flip-flop device are achieved by introducing resistance in either of the two paths thereby to cause the current from the D.C. source to flow in the other path.

Superconductive logical devices may be defined generally as devices which produce an output upon the application of a particular signal or combination of signals thereto. Certain superconductive logical circuits employ a plurality of cryotrons so interconnected that when a pulse is applied to one particular cryotron, or a plurality of pulses are each applied to particular cryotrons, an output signal is developed.

In the superconductive storage devices of the present invention the hysteresis characteristic and the supercooled characteristic are used. Superconductors are operated generally in one of two states, a superconductive state or a normal state. The hysteresis characteristic of a superconductor is exhibited when the superconductor is caused to go from a superconductive state to a normal state and back to the superconductive state. A critical field is that field necessary to cause a material in the superconductive state to assume the normal state with temperature remaining constant. This defines one portion of the hysteresis curve. Some superconductors do not return to the superconductive state until the field is reduced to a given value which may be appreciably less than the critical field. This defines another portion of the hysteresis curve, and the resultant curve may be substantially rectangular or square. Such a curve provides the basis for using the material as a storage element. For a more detailed discussion of the hysteresis characteristic reference may be made to the book Superconductivity by D. Shoenberg, Cambridge University Press, 1952.

The superconductive storage devices and the superconductive logical devices of the present invention may be operated in a manner to take advantage of a phenomenon termed nucleation which may be utilized when a superconductor is supercooled. Supercooled refers to the condition of a superconductor when it remains in the normal state even though the applied magnetic field (or applied temperature) is reduced below the critical value for the transistion to the superconductive state. When a superconductor is in this condition, it is said to be in a supercooled state. If a portion of a superconductor which is in the supercooled state is caused to go superconductive, a superconductive nucleus is established, and this nucleus spreads or grows through the superconductor until the superconductor is entirely superconductive. For a more detailed discussion of the supercooled state of superconductors and the process of nucleation of the superconductive state, reference may be made to the book by D. Shoenberg, Superconductivity, Cambridge University Press, 1952, and to the articles by T. E. Faber, "The Phase Transistion in Superconductors I" and "The Phase Transistion in Superconductors III," which appeared in the Proceedings of the Royal Society of London, Series A, volume 214, pp. 392–412 (1952), and Series A, volume 223, pp. 174–194 (1954), respectively.

In employing the hysteresis characteristic of a superconductor in a storage device, a bias field is applied to a superconductor element, and a momentary information field is applied in adding relationship to the bias field. The information field sets the superconductor element in a normal state, and may subsequently leave the element supercooled. When the superconductor element is in the normal state, the element may be considered to have a One stored therein. In order to read out the One a momentary information field is applied in subtracting relationship to the bias field which sets the superconductor element in a superconductive state. The superconductive state may be taken to indicate that a Zero is stored in the superconductor element, and thus it may be seen, as will be explained in greater detail hereinafter, that the readout of a One concurrently stores a Zero in the element and vice versa. A winding wound on the superconductor element senses the changes of state and provides an output pulse indicative of the information stored therein. A superconductive storage device of this nature employs only three components and may be operated extremely fast.

In utilizing the concept of nucleation of a superconductive state, the present invention provides a superconductive storage device which includes a superconductor element which is supercooled, or set in a supercooled state, by applying a bias field and subsequently applying an information pulse. A portion of the superconductor element is then caused to assume a superconductive state or a superconductive nucleus is established in that portion, by applying a pulse to a winding wound on that portion of the superconductor element. When this portion of the superconductor element goes superconductive, the superconductive state nucleates and spreads along the element. Another winding, which is wound on another portion of the superconductor element, senses the change of state as it spreads and provides an information output signal which may be made larger than the input signal required for the change of state as will be described in detail hereinafter. This storage device employs only a few components resulting in a saving of space and a saving of a number of superconductive components required in other superconductive storage devices.

The logical devices provided by the present invention are also based on the concept of nucleation of the superconductive state. A supercooled state is established in a superconductor element, and one or more windings wound on a particular portion or portions of the element produce a superconductive state or a superconductive nucleus, in that portion or portions, respectively, of the element when a particular pulse or combination of pulses is applied to the windings. This superconductive state spreads through the element, and an output winding, disposed on another portion of the element, provides an output signal indicative of the spread of the superconductive state. The output signal may be made larger than the pulse or pulses required to produce the change of state. The superconductive logical devices provided by the present invention may utilize a minimum number of components thereby resulting in a saving of equipment and space over prior superconductive logical devices which involved a relative large number of superconductive components or cryotrons.

Another feature of the present invention is in the provision of a superconductive storage device which may include a minimum of four components and in which the output signal therefrom may be made larger than the readout signal.

A further feature of the present invention is in the provision of a superconductive device which may be used as a storage or logical device, and in which gain or amplification may be realized.

These and other features of this invention may be more fully appreciated when considered in the light of the following specification and drawings in which:

FIG. 1 is an illustration of a superconductive storage device employing the principles of this invention;

FIG. 1*a* is a Resistance versus Magnetic Field Curve of a superconductor;

Figure 1:
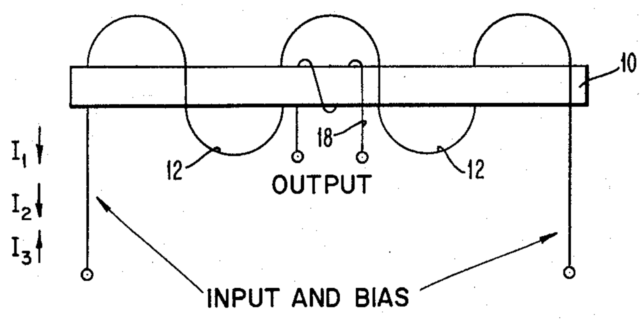

Each of the superconductor elements, such as the element 10 in FIG. 1, of the superconductive devices of the present invention is constructed of a material which is: (1) in a normal state when a critical magnetic field, $H_c$, or a greater magnetic field, is applied thereto which occurs when a current of a predetermined value is caused to flow in its windings, and which remains in the normal state until the field is reduced to a particular value below $H_c$; (2) in a superconductive state when no field, or a field below $H_c$ is applied thereto; and (3) which may be supercooled, or in a supercooled state, when a field $H_1$ is present. Supercooling takes place during the normal state, but the normal state may exist without supercooling occurring. The relationships of the magnitudes of the magnetic fields are such that $H_c>H_1>H_0$. The remaining portions of the superconductive devices, that is, the windings wound on the superconductor elements, are fabricated of superconductive material which remains in a superconductive state under all conditions of operation. For example, the superconductor elements may be constructed of tin, aluminum, or other suitable materials; whereas, the remaining portions of the circuit may be constructed of niobium or other suitable materials such as those discussed in the article by D. A. Buck, "The Cryotron—A Superconductive Computer Component," Proceedings of the IRE, pp. 482–493, April 1956.

While the superconductor rod and ring elements of the storage and logical devices shown in the drawings are depicted as the wire wound type, this is done because it is believed that this type of representation provides a more graphic illustration. However, in practice film-type superconductor rod and ring elements are preferably employed in the devices constructed and operated in accordance with the principles of the present invention. The devices of the present invention may be constructed similar to film-type cryotrons. For a detailed discussion of film-type cryotrons which are constructed like superconductive devices of the instant invention and the manner in which they may be constructed, reference may be made to copending applications, Serial No. 625,512 and Serial No. 765,760, now Patent No. 3,047,230, filed on November 30, 1956, and October 7, 1958, respectively, both of which have been assigned to the assignee of the present invention.

According to one feature of this invention, a superconductor rod element 10 of the storage device shown in FIG. 1 is wound with a bias and information winding 12. The winding 12 serves to provide a bias field for the rod element 10, and information and readout fields for the element. An output winding 18 is wound on the rod element 10 to provide an output signal upon a change of state of the rod element 10. The winding 12 may be connected to suitable sources, not shown, to provide the desired magnetic fields along the element 10 as will be explained in greater detail hereinafter. The output winding 18 may be connected to a load circuit, indicator, etc., as desired.

Figure 1A:
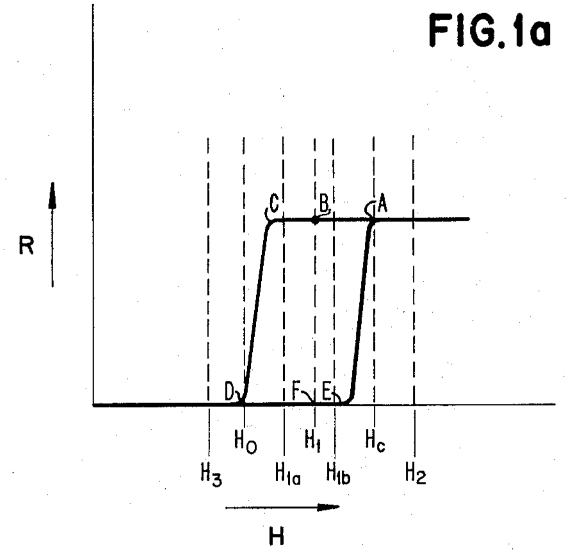

The operation of the superconductive storage device of FIG. 1 is now described in connection with the Resistance-Magnetic Field curve, or hysteresis curve, of FIG. 1*a*. The curve of FIG. 1*a* is idealized, but this curve is similar to those derived from experimentation with superconductors. The curve of FIG. 1*a* illustrates the hysteresis of a superconductor element. The superconductor element is in a superconductive state between points D and E; in a normal state between points A and C; is supercooled or in a supercooled state between points B and C; and in an intermediate state between points C and D. The supercooled state exists during the normal state, and it begins at some point to the left of the point A depending on the material employed. For purposes of illustration herein the superconductor element is taken to be supercooled between points B and C. Assuming that the rod element 10 is in the superconductive state, a bias current $I_1$ is applied continuously to the winding 12. This bias current is sufficient to maintain a uniform bias field $H_1$ (FIG. 1*a*) along the element 10. After the bias field $H_1$ is established, a current pulse $I_2$ which is representative of a One is applied to the winding 12. This current pulse $I_2$ adds to the bias current $I_1$ in the winding 12 so that the field along the element 10 is momentarily increased to $H_2$ (FIG. 1*a*), or some field greater than $H_c$. The current pulse $I_2$ causes the element 10 to go completely resistive or, normal, and upon the termination of this pulse the element 10 is left in a supercooled state at point B on the curve of FIG. 1*a*. Depending upon the choice of materials and the magnitude of the bias field $H_1$, the superconductor element 10 apparently may be supercooled at any point between points A and C on the curve of FIG. 1*a*. However, it is not necessary in the operation of the device of FIG. 1 that the superconductor element 10 be supercooled. The bias field $H_1$ may be chosen to be of a value (between the points A and C) to keep the element in the normal state without supercooling taking place, if desired.

Readout of the One stored in the element 10 is accomplished by applying a current pulse $I_3$ to the winding 12. The current pulse $I_3$ is equal in magnitude but opposite to the current pulse $I_2$. The current pulse $I_3$ produces a field in opposition to the bias field $H_1$ produced by the winding 12, and lowers the total magnetic field linking the element 10 to a value of $H_3$. The current pulse $I_3$ may be of any magnitude which produces a field lower than $H_0$. When the field along the element 10 is lowered to $H_3$, the element 10 assumes a superconductive state. When the element 10 goes superconductive, the field produced by the winding 12 is excluded from the element 10 and an output signal (as a result of the explusion of this field) is produced across the output winding 18. The expulsion of the field from the element 10 is a phenomenon of superconductors. Any applied magnetic field less than the critical field ($H_c$ of FIG. 1*a*) necessary to maintain the superconductor element normal cannot pierce or cut through the superconductor element which is in a superconductive state. Hence, a superconductor element in the superconductive state is a perfect insulator or barrier to magnetic fields having an intensity less than that of the critical field. An explanation for this effect is that the field actually penetrates small depths on the order of $10^{-5}$ centimeters into the surface of the element and thereby induces a surface current which, because of zero resistance in the element, is sufficient in amplitude to produce a field of equal intensity but in opposition to the applied field. In other words, the applied field is counteracted or neutralized by the field resulting from the induced surface current. Therefore, when the flux penetrating a superconductor element is excluded therefrom, a voltage is induced in an output winding wound on the element.

The current pulse $I_3$ applied to the winding 12 serves not only to read out the One stored in the element 10, but also, to store a Zero in that element. Upon the termination of the current pulse $I_3$, the element 10 is left in its superconductive state which is indicative of a Zero stored therein. The element 10 remains in the superconductive state until the Zero is read out by applying the current pulse $I_2$. Note that the bias field $H_1$ does not penetrate the element 10 which is now superconductive until the current pulse $I_2$ is applied, because the bias $H_1$ is of an intensity less than that of the critical field and the element 10 acts as a barrier to the bias field. When the current pulse $I_2$ is applied to the winding 12 to read out the Zero stored in the element 10, a change of flux takes place in the element 10. This change of flux produces an output across the output winding 18 of a polarity opposite to the output produced when a One is read out. However, the output pulse produced when reading out a Zero is of a magnitude slightly larger than the output signal produced when a One is read out, and the difference in magnitude between these two pulses is a value which is proportional to $H_2-H_1$. The difference in magnitude of the two output signals is of no consequence since these two signals have different polarities, and only the polarity of the output signal is used to indicate whether a One or a Zero is stored in the element 10. In addition to this difference in the two output signals, a small transient pulse results from the decay of the field $H_2-H_1$ during the read out of a Zero, but this transient pulse is of insignificant magnitude to affect the operation of the storage device.

It now should be apparent that by applying a current pulse ($I_2$ or $I_3$) to the winding 12 which is biased with the direct current $I_1$, and observing the polarity of the signal produced across the output winding 18, the information stored in the storage device may be ascertained. Although the winding 12 is illustrated as a bias, an information input and a readout winding, separate windings may be employed to perform these functions if desired. Furthermore, the storage device of FIG. 1 may be employed as a read out device for a cryotron circuit. In such a case, the output from the cryotron circuit is applied to the winding 12 and used to change the state of the element 10 to thereby give an output signal across the winding 18.

Figure 6:
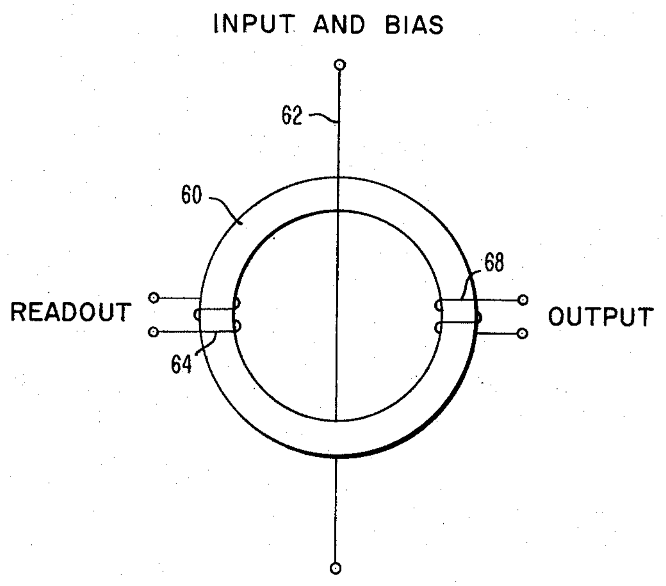
FIG. 6 illustrates a more compact form for the devices of the present invention and one which is more adaptable to matrix operation.

In the superconductive storage device of FIG. 1, the element 10 may be torodial in shape as is illustrated in FIG. 6. This configuration enables the construction of a more compact device, and one especially adaptable to matrix operation. The windings 62 and 68 of FIG. 6 are equivalent to the windings 12 and 18 of FIG. 1, respectively. The operation of the device of FIG. 1 remains the same and only two windings are required. The winding 64 of the device shown in FIG. 6 is not necessary if the toroidal element is employed in the device of FIG. 1.

Figure 2:
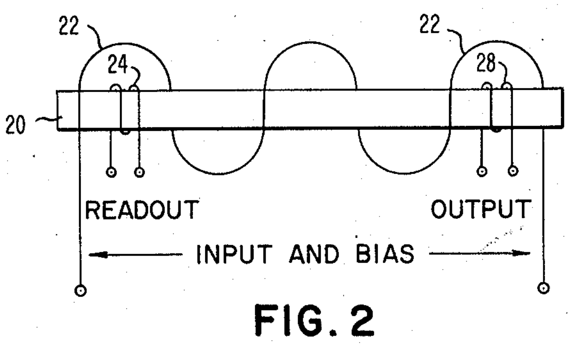
FIG. 2 illustrates another superconductive storage device according to the present invention.

According to another feature of this invention, FIG. 2 illustrates a superconductive storage device which relies on the property of nucleation of the superconductive state. A superconductor rod element 20 of the storage device shown in FIG. 2 is wound with a bias and information input winding 22. A read out winding 24 is wound around a left-hand portion of the rod element 20 to provide a localized field in opposite to that produced by the winding 22; and an output winding 28 is wound about a right-hand portion of the rod element.

In operation, the superconductor rod element 20 of FIG. 2 is caused to assume, at one time or another, each of its possible states; a normal state, a supercooled state or a superconductive state. A bias current is applied continuously to the winding 22, and this bias current is sufficient to maintain a uniform bias field $H_1$ along the element 20. The bias field $H_1$ may be considered as an intermediate field since it is chosen to be less than the critical field $H_c$ (the field which causes the superconductor rod element to go normal), and greater than the field $H_0$ (note FIG. 1*a* in which $H_0$ is the field below which the superconductor rod element goes superconductive). The relationship between the three fields is such that $H_c>H_1>H_0$. After the bias field $H_1$ is established in the superconductor element 20, a current pulse which is representative of input information is applied to the winding 22 which adds to the bias current in this winding so that the field along the element 20 is $H_2$, or some value greater than $H_c$, momentarily. This pulse makes the element 20 normal and upon its termination the element 20 is left in a supercooled state, the latter state being that which the element 10 assumes when information is stored therein. Read out of the information is accomplished by applying a current pulse to the read out winding 24. This current pulse produces a field in opposition to the bias field $H_1$ produced by the winding 22, and lowers the total magnetic field in the vicinity of the winding 24 to a value less than $H_0$ (such as $H_3$). When the total field in the vicinity of the winding 24 is lowered to a value less than $H_0$, the portion of the element 20 linked by the winding 24 assumes a superconductive state. When the transition from the supercooled to the superconductive state occurs in the portion of the element 20 linked by the winding 24, the superconductive state spreads or nucleates through the element 20. When the superconductive state spreads to the right-hand portion of the element 20 in the vicinity of the winding 28, the field or flux produced by the winding 22 is excluded from the right-hand portion of the element 20 and an output signal (as a result of the expulsion of this field) indicative of the stored information is produced across the output winding 28.

It now should be apparent that by applying a pulse to the read out winding 24, and observing the voltage across the output winding 28 the information stored in the element 20 may be ascertained. When the information stored in the element 20 is read out, the information therein is destroyed so that any subsequent pulse applied to the read out winding 24 will not produce an output from the winding 28 since the element 20 is already in the superconductive state. Information may be stored again in the element 20 by applying an information pulse to the winding 22 which causes the element 20 to assume its supercooled state. The presence of information in the storage device of FIG. 2 may be taken to indicate a One, and the absence of information therein taken to indicate a Zero. In such a case, a read out pulse applied to the winding 24 concurrently reads out the One and stores a Zero, and an information pulse applied to the winding 22 destroys the Zero and stores a One. The presence of a stored One or a stored Zero is indicated by the presence or absence, respectively, of an output signal from the winding 28 upon the application of a read out pulse to the winding 24.

According to another feature of the present invention, the output signal from the output winding 28 may be made much larger than the required read out pulse applied to the read out winding 24. This is accomplished by the particular choice of magnitudes for the magnetic fields $H_c$, $H_1$ and $H_0$. $H_1$ is made much larger than $H_1-H_0$. A read out pulse is required which produces a field only slightly larger than $H_1-H_0$, and the resulting output signal from the winding 28 is produced by the expulsion of the entire bias field $H_1$. Gain or amplification may also be realized by making $H_1$ much greater than $H_c-H_1$. The required input pulse to the read out winding 24 in this case has to produce a field only slightly larger than $H_1-H_0$ which is less than $H_1$ (the expulsion of which produces the output signal) and, therefore, a read out pulse of the required magnitude produces an output signal of a greater magnitude. In practice, it is desirable to have the read out winding 24 and the output winding 28 fairly close together to minimize the delay occasioned during spreading of the superconductive state.

In the storage device of FIG. 2, another winding similar to the winding 22 may be employed as the information input winding to apply a field greater than $H_c$ to the element 20 instead of using the winding 22 as a dual purpose winding. Also, the storage device of FIG. 2 may be used to read out information from cryotron circuits. The output from the cryotron circuit may be applied to the winding 22, or the winding 24 (if the element 20 is set in a supercooled state).

Figure 3:
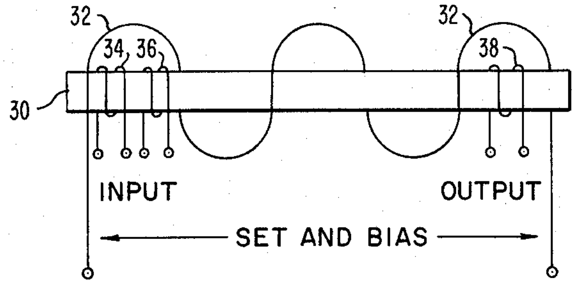
FIG. 3 illustrates a superconductive logical OR device constructed in accordance with the principles of this invention.

According to a further feature of this invention, FIG. 3 illustrates a logical OR device which employs the above discussed property of nucleation of the superconductive state. The device of FIG. 3 includes a superconductor rod element 30 which may be set in a supercooled state by means of a bias and set winding 32. A pulse applied to either an input winding 34 or an input winding 36 causes an output to be produced from an output winding 38.

In the operation of the logical OR device of FIG. 3, a continuous bias current is applied to the winding 32 of a magnitude sufficient to produce a bias field $H_1$ along the element 30. A set pulse is applied to the winding 32. This set pulse, which adds to the bias current in the winding 32, is sufficient to produce a momentary field greater than $H_c$ (such as $H_2$ in FIG. 1*a*) in the element 30. The set pulse makes the element 30 normal and upon its termination leaves the element 30 in a supercooled state. An input pulse is applied to either the input winding 34 or the input winding 36. This input pulse locally reduces the field produced by the winding 32 in the element 30 to a value less than $H_0$ and causes a portion of the element 30 linked by the particular one of these windings to which the input pulse is applied to assume a superconductive state. This superconductive state nucleates or spreads along the element 30. When the superconductive state in the element 30 spreads to a right-hand portion of the element 30 in the vicinity of the output winding 38, the flux produced by the current in the winding 32 is excluded from the right-hand portion of the element 30 and an output signal appears across the winding 38. Thus, it should be apparent that a pulse applied to the input winding 34 or to the input winding 36 produces an output signal from the winding 38. After the element 30 goes superconductive, the supercooled state may be re-established therein by applying a reset pulse to the winding 32.

Figure 4:
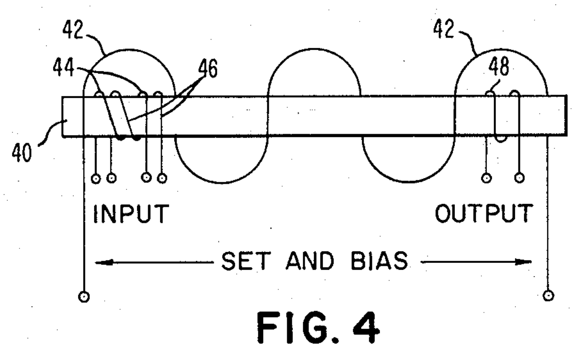
FIG. 4 illustrates a superconductive logical AND device employing the concepts of the instant invention.

The logical AND device of FIG. 4 includes a superconductor rod element 40 around which is wound a bias and set winding 42. A pair of coaxially wound input windings 44 and 46 link a left-hand portion of the element 40 to cause that portion to go superconductive upon the simultaneous application pulses to the input windings 44 and 46. An output winding 48 is employed to provide an output signal when the element 40 shifts from a supercooled state to a superconductive state.

According to a feature of the present invention, the superconductor element 40 of the logical device of FIG. 4 is initially set in a supercooled state by applying a continuous bias current to the winding 42 of a magnitude sufficient to produce a bias field $H_1$ along the superconductor rod element 40, and subsequently pulsing this winding with a set pulse of sufficient magnitude to produce a momentary field greater than $H_c$ along the element 40. The input windings 44 and 46 are each wound on the element 40 in the same direction and arranged so that input pulses of particular magnitudes applied simultaneously to each of these input windings produces a field in opposition to the bias field $H_1$ in the portion of the element 40 linked by these input windings. The input pulses simultaneously applied to the input windings 44 and 46 cause the left-hand portion of the element 40 to assume a superconductive state. The superconductive state produced in the left-hand portion of the element 40 nucleates or spreads along the element 40. When a portion of the element 40 linked by the output winding 48 goes superconductive, the flux produced by the current flowing in the winding 42 is excluded from the right-hand portion of the element 40 and an output signal is produced across the winding 48. The input windings 44 and 46 and the pulses applied thereto are such that the left-hand portion of the superconductor element 40 that is linked by these input windings does not go superconductive unless a pulse is applied to each of these input windings simultaneously. Since the element 40 goes superconductive after the simultaneous application of pulses to the input windings 44 and 46, the device must be reset to the supercooled state by applying a reset pulse to the winding 42 before another operation can take place. Therefore, it should be apparent that a superconductive logical AND device is provided which produces an output upon the simultaneous application of a pair of pulses to the input windings thereof.

Figure 5:
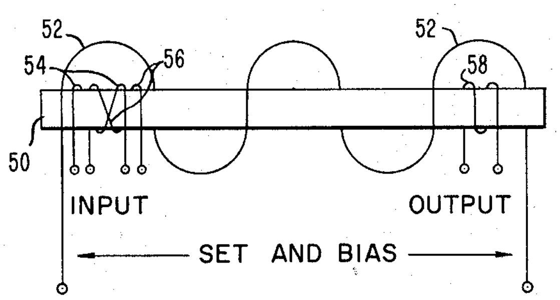
FIG. 5 illustrates a superconductive logical INHIBIT device constructed in accordance with the principles of the present invention.

FIG. 5 illustrates a logical INHIBIT device. A bias and set winding 52 is wound around the superconductor element 50, and a pair of input windings 54 and 56 are coaxially wound on a left-hand portion of the element 50. The input windings 54 and 56 are wound in opposite directions, with the winding 54 being wound in the same direction as the winding 52 and the winding 56 being wound in a direction opposite thereto. An output winding 58 is wound on a right-hand portion of the superconductor element 50.

According to a feature of the present invention, a continuous bias current is applied to the winding 52 of the INHIBIT device of FIG. 5 which establishes a bias field $H_1$ along the superconductor rod element 50. Subsequently, a set pulse is applied to the winding 52 of a magnitude sufficient to establish a field momentarily in the element 50 greater than $H_c$ and this field establishes a supercooled state in the element 50. An input pulse applied to the input winding 56 produces a field which opposes the bias field $H_1$ and makes the left-hand portion of the element 50 linked by this winding assume a superconductive state. This superconductive state spreads or nucleates through the element 50. When a right-hand portion of the element 50 that is linked by the output winding 58 goes superconductive, the flux linking the element 50 as a result of the current flowing through the winding 52 is excluded from the right-hand portion of the element 50 and an output signal is produced across the output winding 58. Assuming that the supercooled state is again established in the superconductor element 50 a pulse applied to the input winding 54 has no effect on the element 50 since a field produced by this winding adds to, rather than, subtracts from the bias field $H_1$ produced by the winding 52. Furthermore, a pulse simultaneously applied to each of the input windings 54 and 56 has no effect on the element 50 since the flux produced by one of the input windings 54 or 56 cancels the other. It now should be apparent that the logical INHIBIT device of FIG. 5 provides an output signal whenever a pulse is applied to one particular input winding; and provides no output signal when a pulse is applied to the other input winding or when pulses are applied simultaneously to both of the input windings. The device may be reset to the supercooled state by applying a reset pulse to the winding 52.

According to another feature of the present invention, gain or amplification may be realized when operating any of the logical devices shown in FIGS. 3 through 5. The manner of providing gain in these devices is the same as that described for the storage device of FIG. 2. The signal produced across the output coil of each of the logical devices may be made much larger than the pulses applied to the input windings by making the bias field $H_1$ much larger than $H_1-H_0$. The transition from the supercooled state to the superconductive state is caused by a field slightly larger than $H_1-H_0$ applied in opposition to the bias field $H_1$, and the output signal produced across the output coil is produced by the expulsion of the entire bias field $H_1$. A similar result can be accomplished by making the bias field $H_1$ much larger than $H_c-H_1$.

The number of windings, as well as the spacing and number of turns thereof employed in the devices shown in FIGS. 3 through 5 are illustrative only, and different spacings, more windings or turns may be employed as desired. For example, in the logical device shown in FIG. 4, three input windings may be employed thereby requiring three coincident pulses to produce an output signal. The spacing between the input windings and the output winding of each of the logical devices of FIGS. 3 through 5 is preferably close so as to minimize the delay, which occurs during the nucleation of the superconductive state through the superconductor element, between the application of a pulse to an input winding and the output signal.

FIG. 6 shows a more compact form of the superconductive devices of FIGS. 2 through 5 which is adaptable to matrix type systems. Although a superconductor element 60 is illustrated in the form of a ring, this configuration is adaptable to each of the devices of FIGS. 2 through 5. A bias and information input winding 62 links the superconductor ring element 60 to initially set the element in a supercooled state. A continuous bias current is applied to the winding 62 which products a bias field $H_1$ in the ring element 60. An information pulse is applied to the winding 62 of a magnitude sufficient to establish a momentary field greater than $H_c$ in the ring element 60. This information pulse sets the element 60 in the supercooled state. A pulse applied to the read out winding 64 produces a field in the portion of the ring element 60 linked by the winding 64 in opposition to the field produced by the winding 62 and makes that portion of the ring element 60 assume a superconductive state. The superconductive state spreads along the ring element 60 and subsequently excludes the flux produced by the winding 62 from the element thereby producing an output signal across the winding 68. Input windings may be employed on the superconductor ring element 60 in place of the read out winding 64 to provide the logical functions provided by the devices of FIGS. 3 through 5.

Figure 7:
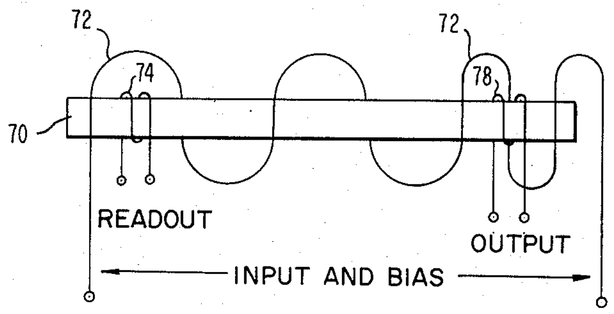
FIG. 7 illustrates the manner in which the superconductor device in accordance with the present invention is constructed to provide high gain, high speed operation.

The storage device shown in FIG. 7 performs functionally in the same manner as the device shown in FIG. 2. However, the device of FIG. 7 is faster and exhibits higher gain. This two-fold improvement is realized by using a bias coil 72 which is wound more tightly on the output portion of the element 70. Thus, when a current signal is applied to the coil 72, the intensity of the magnetic field applied to that portion of the element 70 which is encompassed by output winding 78 is greater than the field applied to the remaining portions of this element. The gain of the element depends upon the ratio of the bias field applied to the portion of the element which is embraced by the output coil 78 to the field necessary to be applied to the input or read out coil 74 to nucleate the superconductive state in the element. In the device of FIG. 7, the bias current applied to the coil 72 is sufficient to cause a bias field having a magnitude represented at $H_{1a}$ in FIG. 1*a* to be applied to the greater portion of the element 70, including the portions embraced by read out coil 74. The bias coil applies a magnetic field having an intensity equal to that designated at $H_{1b}$ in FIG. 1*a* to the output portion of the element 70. With this type of arrangement, it is evident that only a very small signal is required in the read out winding 74 to nucleate the superconductive state in the portion of the element embraced by this winding. Once the superconductive state is nucleated it spreads along the entire element since, though the output portion is subjected to a more intense bias field, the entire element is in a supercooled state. The spreading of the superconductive state through the output portion of the element 70 causes the exclusion of the bias field from this portion of the element and produces an output signal on output winding 78. Since the intensity of the bias field applied to the output portion of the element is great, a large output signal is realized. Thus, by using the arrangement shown in FIG. 7, the magnitude of the read out signals is reduced and the magnitude of the resulting output signal is increased so that high gain is achieved.

Another important characteristic of the device constructed in the manner shown in FIG. 7 results from the fact that the speed at which the superconductive state spreads along the element 70 is proportional to the degree of supercooling of the element. Thus, the superconductive state spreads faster in an element biased at a magnetic field $H_{1a}$, than in an element biased at a field $H_{1b}$. It is for this reason that the portion of the element between the input and output sections is biased with the lower bias field so that it is in effect supercooled to a high degree. Thus, not only is high gain achieved in the device of FIG. 7, but also high speed of operation.

It should be apparent that each of the other embodiments of the invention described herein may be modified as shown in FIG. 7 in order to achieve the high gain, high speed characteristics realized by this type of construction. It should not noted, however, that when this type of construction is employed in logical devices which respond to coincidently applied input signals to initially nucleate the superconductive state, it is necessary that the biasing magnetic field applied to the input portion of the device be sufficiently large to allow the device to remain unaffected by one input signal. Further, the signals applied to the input coil to switch the element between its stable states must be of sufficient magnitude to switch both the input and output portions which are subjected to biasing fields of different intensity.

It now should be apparent that the present invention disclosed superconductive devices which may be used for information storage or as logical devices. In one of the storage devices disclosed, an information pulse establishes either a normal state (during which the superconductor element may be supercooled) or a superconductive state indicative of a stored One or a stored Zero, respectively, in a superconductor element. The application of an information pulse also causes an output signal to be produced which is indicative of the information previously stored in the device. In another of the storage devices disclosed, an information pulse establishes a supercooled state which is indicative of stored information in a superconductor element. This stored information is read from the device by applying a read out pulse which renders a portion of the element superconductive, and subsequently the entire element superconductive, thereby producing an output signal representation of the information stored. In the logical devices disclosed herein, a supercooled state is established in a superconductor element and a transition from this state to a superconductive state occurs upon the application of a particular pulse or a particular combination of pulses to the input windings wound on a portion of the element thereby producing an output signal in an output winding wound on another portion of the element. In each of the superconductive devices disclosed in FIGS. 2 through 7, gain or amplification may be realized during the operation thereof by the use of particular relationships between the fields produced by the windings employed in the devices.

What is claimed is:

1. A superconductor device comprising an element of superconductive material; said element when maintained at a particular temperature exhibiting a magnetic transition characteristic between superconductive and normal states in the form of a hysteresis loop; magnetic field applying means continuously biasing said element with a bias field such that the element is capable of remaining stable in either a superconductive or normal state and for applying magnetic fields to the element to switch it from one to the other of said states; said magnetic field applying means supplying bias fields of different intensity to different portions of said element; and magnetic field responsive means coupled to said element for producing output signals when said element is switched from one of said states to the other.

2. A superconductive storage device comprising: an element of superconductor material capable of having a superconductive state and a normal state; first winding means linking said element; second means to apply a bias current to said first winding means to thereby produce a bias field linking said element; third means to apply a pulse to said first winding means to thereby produce a field linking said element which establishes one of said states in said element; and fourth means directly responsive to a change in the field linking said element to provide an output signal when either one of said states is established in said element.

3. A superconductive storage device comprising: an element of superconductor material capable of having a superconductive state and a supercooled state; a first winding linking said element; a second winding linking said element; first means to apply current to said first winding to thereby establish a bias field linking said element; second means to apply a first pulse to said first winding to thereby produce a field linking said element which establishes one of said states in said element; third means to apply a second pulse to said first winding to thereby produce a field linking said element which establishes the other of said states in said element; whereby said second winding provides an output signal upon a change of state of said element.

4. A superconductive storage device as in claim 3 wherein said first pulse establishes a One in said device and said second pulse concurrently causes a read out of said One and establishes a Zero in said device.

5. A superconductive storage device comprising: an element of superconductor material having a superconductive state and a supercooled state; first means to apply a magnetic field to a large portion of said element to establish said supercooled state in said element; second means to apply a magnetic field to a small portion of said element to establish said superconductive state in said small portion, whereby said superconductive state spreads from said small portion throughout said element; and third means to provide an output signal as said superconductive state spreads through said element.

6. A superconductive storage device as in claim 5 wherein said element is toroidal in shape.

7. A superconductive logical device comprising: an element of superconductor material capable of having a first state and a second state; first means to apply a field to a large portion of said element to establish said second state therein; second means to apply a field to a small portion of said element to establish said first state in said small portion, whereby said first state is established in said small portion and spreads along said element; and third means to provide an output signal as said first state spreads along said element.

8. A superconductive logical device as in claim 7 wherein said second means includes at least two windings coaxially wound about a portion of said element and coincident energization of said windings establishes said first state in said portion.

9. A superconductive logical device as in claim 7 wherein said second means includes at least two windings coaxially wound about a portion of said element and energization of one of said windings establishes said first state in said portion.

10. A superconductive logical device as in claim 7 wherein said element is toroidal in shape.

11. A superconductive logical device comprising: an element of superconductor material capable of having a superconductive state and a supercooled state; first means to apply a field to said element to establish said supercooled state therein; second means to apply a field to a portion of said element to establish said superconductive state in said portion, whereby said superconductive state spreads along said element; said second means including at least two windings each of which is wound around a separate portion of said element; and third means to provide an output signal as said superconductive state spreads along said element.

12. A superconductive device comprising: an element of superconductor material in which a superconductive state or a supercooled state may be established; first means to apply a field to said element; second means to apply a field to a first portion of said element; third means to apply a first pulse to said first means to establish a supercooled state in said element; fourth means to apply a second pulse to said second means to establish a superconductive state in said first portion of said element whereby said superconductive state spreads through said element; and fifth means to determine when said superconductive state has spread to a second portion of said element whereby said fifth means provides an output signal of a magnitude greater than said second pulse.

13. A superconductive storage device comprising: an element of superconductor material having superconductive and supercooled states; first means to apply an information pulse to said device to thereby produce a field along said element which establishes said supercooled state in said element; second means to apply a read out pulse to said device to thereby produce a field in a portion of said element which establishes a superconductive state in said portion whereby said superconductive state spreads through said element; and third means to provide an output signal of a magnitude greater than said read out pulse as said superconductive state spreads through said element.

14. A superconductive logical device comprising: an element of superconductor material having superconductive and supercooled states; first means to apply a field to said element to establish said supercooled state therein; second means to apply an input pulse to said device to produce a field in a portion of said element which establishes a superconductive state in said portion whereby said superconductive state spreads through said element; and third means to provide an output signal of a magnitude greater than said input signal as said superconductive state spreads through said element.

15. A superconductor storage device comprising: an element of superconductor material having a superconductive state and a supercooled state; magnetic field applying means for causing said element to assume a supercooled state; said magnetic field applying means including means for applying bias fields to said element with the bias fields applied to a first portion of said element being more intense than the bias field applied to a second portion of said element; further means for applying magnetic fields to said second portion of said element to establish said superconductive state in said second portion;

whereby said superconductive state spreads through said element to and through said first portion thereof; magnetic field responsive means coupling said first portion of said element for providing an output signal when said superconductor state spreads through said first portion of said element.

References Cited in the file of this patent

UNITED STATES PATENTS

| | | |
|---|---|---|
| 2,832,897 | Buck | Apr. 29, 1958 |
| 2,980,807 | Groetzinger et al. | Apr. 18, 1961 |